(12) United States Patent
Jöngren et al.

(10) Patent No.: US 8,537,924 B2
(45) Date of Patent: Sep. 17, 2013

(54) OPEN LOOP PRECODER CYCLING IN MIMO COMMUNICATIONS

(75) Inventors: George Jöngren, Stockholm (SE); David Hammarwall, Stockholm (SE); Patrick Svedman, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 496 days.

(21) Appl. No.: 12/812,159

(22) PCT Filed: May 7, 2008

(86) PCT No.: PCT/SE2008/050530
§ 371 (c)(1),
(2), (4) Date: Jul. 8, 2010

(87) PCT Pub. No.: WO2009/091307
PCT Pub. Date: Jul. 23, 2009

(65) Prior Publication Data
US 2010/0284484 A1 Nov. 11, 2010

Related U.S. Application Data

(60) Provisional application No. 61/020,948, filed on Jan. 14, 2008.

(51) Int. Cl.
*H04B 7/02* (2006.01)
*H04L 1/02* (2006.01)

(52) U.S. Cl.
USPC .......... 375/267; 375/299; 375/347; 375/349; 375/350

(58) Field of Classification Search
USPC ................. 375/260, 267, 299, 346, 347, 349, 375/350
See application file for complete search history.

(56) References Cited

U.S. PATENT DOCUMENTS 8,284,865 B2 * 10/2012 Lee et al. ............... 375/299
2005/0041751 A1 2/2005 Le Nir et al.
(Continued)

FOREIGN PATENT DOCUMENTS

JP 2005-509316 4/2005
JP 2010-532130 A 9/2010
(Continued)

OTHER PUBLICATIONS

International Search Report for PCT/SE2008/050530, mailed Feb. 10, 2009.
(Continued)

*Primary Examiner* — David B Lugo
(74) *Attorney, Agent, or Firm* — Nixon & Vanderhye, P.C.

(57) ABSTRACT

Data is transmitted over multiple input multiple output (MIMO) channels. Plural bit streams are modulated into multiple data symbol vectors. Each vector has a transmission rank with one vector for each MIMO channel. Transmission rank is the number of elements in a data symbol vector corresponding to the number of data streams being transmitted in parallel over each MIMO channel. The multiple data symbol vectors are preceded into multiple precoded symbol vectors using a plurality of precoder cycling sets, one set for each transmission rank including multiple different precoders. The precoders in each precoder cycling set are well-separated with respect to a plurality of distance measures. The precoding includes precoding each data symbol vector of a transmission rank with a precoder belonging to the precoder cycling set of that transmission rank. The precoded symbol vectors are then transmitted over the MIMO channels.

16 Claims, 10 Drawing Sheets

(56) References Cited

U.S. PATENT DOCUMENTS

2006/0039489 A1    2/2006    Ikram et al.
2008/0225962 A1*   9/2008    Zhou et al. .................... 375/260
2008/0303701 A1*  12/2008    Zhang et al. .................. 341/106

FOREIGN PATENT DOCUMENTS

WO    WO 2006/049417       5/2006
WO       2007/052941 A1    5/2007
WO       2008/156081 A1   12/2008

OTHER PUBLICATIONS

Gidlund, M., "Precoded closed-loop MIMO-OFDM system using predefined set of rotation matrices", Electronics Letters, vol. 41, No. 5, (Mar. 3, 2005), pp. 262-263.

Barg, A. et al., "Bounds on packings of spheres in the Grassmann manifold", Information Theory, vol. 48, No. 9, (Sep. 2002), pp. 2450-2454.

Love, D.J. et al., "Limited feedback unitary precoding for orthogonal space-time block codes", Signal Processing, vol. 53, No. 1, (Jan. 2005), pp. 64-73.

3GPP TS 36.211, V8.1.0, $3^{rd}$ Generation Partnership Project; Technical Specification Group Radio Access Network, Evolved Universal Terrestrial Radio Access (E-UTRA); Physical Channels and Modulation (Release 8), (Nov. 2007).

Khan, M.Z.A. et al., "Space-Time Block Codes from Co-ordinate Interleaved Orthogonal Designs", Information Theory, (2002), p. 275.

Leus, G. et al, "Per-tone equalization for MIMO OFDM systems", Signal Processing, vol. 51, No. 11, (Nov. 2003), pp. 2965-2975.

JP Office Action and partial English translation mailed Jan. 18, 2013 in Japanese application 2010-542191.

R1-063345, 3GPP TSG RAN WG1 Meeting #47, "CDD-Based Precoding for E-UTRA Downlink MIMO", LG Electronics, Samsung, NTT-DoCoMo, Riga, Latvia, Nov. 6-10, 2006.

R1-080052, 3GPP TSG RAN WG1 Meeting $51bis, "Open-Loop SM for High-Speed UEs", Samsung, Seville, Spain, Jan. 14-18, 2008.

Hassibi, B., et al., High-Rate Codes that are Linear in Space and Time, IEEE Transactions on Information Theory, vol. 48, No. 7, Jul. 2002.

3GPP TSG RAN WG1 Meeting #49bis, "Further Consideration of CDD Precoding," Jun. 25-29, 2007, R1-073183.

3GPP TSG RAN WG1 Meeting #50, "CDD-based Precoding for Open-loop SM in E-UTRA Downlink," Aug. 20-24, 2007, R1-073495.

* cited by examiner

OPEN LOOP PRECODER CYCLING IN MIMO COMMUNICATIONS

This application is the U.S. national phase of International Application No. PCT/SE2008/050530 filed 7 May 2008, which designated the U.S., and claims the benefit of U.S. Provisional Application No. 61/020,948 filed 14 Jan. 2008, the entire contents of which is hereby incorporated by reference.

PRIORITY APPLICATION

Priority is claimed from U.S. provisional patent application Ser. No. 61/020,948, filed on Jan. 14, 2008, the disclosure of which is incorporated herein by reference.

TECHNICAL FIELD

The technical field relates to radio communications, and in particular, to radio communications that use multiple input multiple output (MIMO) techniques.

BACKGROUND

In a typical radio communications system, user communications terminals referred to as user equipment units (UEs) communicate via a radio access network (RAN) with other networks like the Internet. The radio access network (RAN) covers a geographical area which is divided into cell areas, with each cell area being served by a base station, e.g., a radio base station (RBS), which in some networks is also called a "NodeB" or enhanced Node B. A cell is a geographical area where radio coverage is provided by the radio base station equipment at a base station site.

Third Generation (3G) cellular radio systems like Universal Mobile Telecommunications System (UMTS) operating in Wideband Code Division Multiple Access (WCDMA) use different types of radio channels including unscheduled radio channels and scheduled radio channels. Mixed voice/data, circuit/packet switched 3G systems evolved from voice-centric, circuit-switched second generation (2G) systems. Unscheduled channels, sometimes called dedicated channels, are usually allocated to only one user for the duration of a connection carrying information only associated with that one user. Scheduled channels are packet-switched channels over which packets for multiple user connections are carried. Fourth generation (4G) systems, like the Long Term Evolution (LTE) of UMTS and Worldwide Interoperability for Microwave Access (WiMAX), design the air interface based on packet data. Dedicated traffic channels are eliminated in favor of scheduled radio channels in order to simplify the system. Medium access control is thus migrating towards a request resource-grant resource paradigm. In response to actual requests to transmit data from and/or to a user equipment (UE) in the uplink and/or the downlink, the scheduler in the base station dynamically allocates radio resources to satisfy the quality of service requirements associated with the type of data traffic to be transmitted, and at the same time, tries to optimize the system capacity.

FIG. 1 illustrates an example of an LTE type mobile communications system 10. An E-UTRAN 12 includes E-UTRAN NodeBs (eNBs) 18 that provide E-UTRA user plane and control plane protocol terminations towards the user equipment (UE) terminals 20 over a radio interface. An eNB is sometimes more generally referred to as a base station, and a UE is sometimes referred to as a mobile radio terminal or a mobile station. As shown in FIG. 1, the base stations are interconnected with each other by an X2 interface. The base stations are also connected by an S1 interface to an Evolved Packet Core (EPC) 14 which includes a Mobility Management Entity (MME) and to a System Architecture Evolution (SAE) Gateway. The MME/SAE Gateway is shown as a single node 22 in this example and is analogous in many ways to an SGSN/GGSN gateway in UMTS and in GSM/EDGE. The S1 interface supports a many-to-many relation between MMEs/SAE Gateways and eNBs. The E-UTRAN 12 and EPC 14 together form a Public Land Mobile Network (PLMN). The MIMEs/SAE Gateways 22 are connected to directly or indirectly to the Internet 16 and to other networks.

The IEEE 802.16 Working Group on Broadband Wireless Access Standards develops formal specifications for the global deployment of broadband Wireless Metropolitan Area Networks (MAN). Although the 802.16 family of standards is officially called WirelessMAN, it is often referred to as WiMAX. Like LTE, WiMAX/IEEE 802.16e uses scalable orthogonal frequency division multiple access (OFDMA) to support large channel bandwidths, e.g., between 1.25 MHz and 20 MHz with up to 2048 sub-carriers for WiMAX. Another important physical layer feature is support for multiple-in-multiple-out (MIMO) antennas in order to provide good NLOS (non-line-of-sight) characteristics (or higher bandwidth). Multi-antenna techniques can significantly increase the data rates and reliability of a wireless communication system. The performance is in particular improved if both the transmitter and the receiver use multiple antennas resulting in a multiple-input multiple-output (MIMO) communication channel. Such systems and/or related techniques are commonly referred to as MIMO.

One working assumption in LTE relating to MIMO is the support of a spatial multiplexing mode with channel-dependent (closed-loop) precoding. A precoder maps data symbols to be transmitted onto all of the multiple transmission antennas. Different precoders map the symbols in different combinations onto to each antenna. The spatial multiplexing mode achieves higher data rates in favorable channel conditions.

LTE may also support a spatial multiplexing mode with channel-independent (open-loop) precoding in the form of precoder cycling. An example illustration of a MIMO communication model that uses precoder cycling is shown in FIG. 2. Here, the transmitter cycles through four precoders $W_1$-$W_4$ to precode different sets of four baseband symbol vectors to be transmitted, e.g., $s_1$-$s_4$, $s_5$-$s_8$, etc. The precoders, $W_1$-$W_4$, map the symbol vectors, $s_1$-$s_4$, $s_5$-$s_8$, etc. to precoded baseband symbol vectors, $x_1$-$x_4$, $x_5$-$x_8$, etc. through a matrix-vector multiplication operation, e.g., $x_1 = W_1 s_1$. The elements of a precoded baseband symbol have a one-to-one correspondence to the transmit antenna ports. Each precoded baseband symbol vector is thereafter transmitted over one of the effective MIMO channels, $H_1$-$H_4$, $H_5$-$H_8$, etc. An "effective MIMO channel" models the physical radio communications channel along with the physical antennas, radio hardware, and baseband signal processing used to communicate over that channel. Thus, several different communication techniques, e.g., OFDM and CDMA are illustrated as examples in FIGS. 8 and 9 as explained below, may be represented using this same effective channel model.

Cycling is achieved by precoding one symbol $s_1$ with precoder matrix $W_1$, symbol $s_2$ with precoder matrix $W_2$, symbol $s_3$ with precoder matrix $W_3$, and symbol $s_4$ with precoder matrix $W_4$, and then using $W_1$-$W_4$ to precode the next four symbols and so forth. The receiver receives parallel signals $y_1$-$y_4$, $y_5$-$y_8$, etc., and filters them in respective filters $f_1$-$f_4$, $f_5$-$f_8$, etc. modeled based on the four precoders $W_1$-$W_4$ to produce estimates $\hat{s}_1$-$\hat{s}_4$, $\hat{s}_5$-$\hat{s}_8$, etc. of the symbols $s_1$-$s_4$, $s_5$-$s_8$, etc. originally transmitted. Alternatively, the receiver detects the bit-streams represented by the symbols $s_1$-$s_4$, $s_5$-$s_8$, etc. directly from the received parallel signals $y_1$-$y_4$, $y_5$-$y_8$, etc. using maximum-likelihood decoding (or some other decoder metric).

An example illustration of a transmission structure 30 for implementing a precoded spatial multiplexing mode is provided in FIG. 3. A data stream corresponds to a MIMO "layer" 12, and each layer 12 provides one symbol s at a time to a precoder 34. The parallel symbol output from all of the MIMO layers corresponds to a symbol vector s, which is multiplied in the precoder 34 by an $N_T \times r$ precoder matrix $W_{Ndi\ Tx r}$, which serves to distribute the transmit energy substantially in a subspace of the $N_T$ dimensional vector space, where $N_T$ is the number of transmit antennas. If the precoder matrix 34 is confined to have orthonormal columns, then the design of a codebook of precoder matrices corresponds to a Grassmannian subspace packing problem. Each of the r symbols in symbol vector s corresponds to a MIMO layer, and r is referred to as the "transmission rank." Spatial multiplexing is achieved by transmitting the precoder outputs via inverse fast Fourier transformers (IFFTs) 36 used in orthogonal frequency division multiplexed (OFDM) transmissions, where multiple symbols are transmitted simultaneously over the same transmission resource element (RE). The IFFT 36 outputs are transmitted via $N_T$ antenna ports 38. In the case of OFDM, the same RE corresponds to the same frequency subcarrier or "bin." The number of parallel symbols r may be adapted to the current communications channel properties.

Based on the model in FIG. 2, a received $N_R \times 1$ vector $y_k$ for a certain resource element on frequency subcarrier k (or alternatively data RE number k), assuming no inter-cell interference, is represented for each subcarrier k by:

$$y_k = H_k W_{N_T \times r} s_k + e_k \quad (1)$$

where $H_k$ represents the effective MIMO communications channel, $W_{N_T \times r}$ is an $N_T \times r$ precoder matrix, $s_k$ is an $r \times 1$ symbol vector, and $e_k$ is a noise vector obtained, e.g., as realizations of a random process.

The precoder matrix 34 may be chosen to match the characteristics of the overall $N_R \times N_T$ MIMO channel H (made up of multiple individual MIMO channels $H_1$-$H_8$ etc.), resulting in so-called channel dependent precoding. This is also commonly referred to as closed-loop precoding and essentially aims to focus the transmitted energy into a subspace that conveys much of the transmitted energy to the UE, rather than "waste" transmitting the signal in areas where the UE is not located. In addition, the precoder matrix may also be selected to orthogonalize the channel, meaning that after linear equalization at the UE receiver, inter-layer interference (interference between different MIMO layers) is reduced.

In closed-loop precoding, the UE transmits a feedback signal, based on channel measurements in the downlink, with recommendations to the base station of a precoder to use that is well-suited to the current channel measurements. A single precoder that is supposed to cover a large bandwidth (wideband precoding) may be fed back. It may also be beneficial to match the frequency variations of the channel and instead feed back a frequency-selective precoding report, e.g, several precoders, one per subband. Subspace refers to spatial dimensions and bandwidth to frequency which may be divided into subbands. The appropriate precoder typically varies with frequency (subband). Hence, having a precoder per subband rather than one for all subbands (wideband) enables better precoder adaptation.

A problem with closed-loop precoding is that it takes time to convey the UE's precoder report to the base station, and during that time, the channel may have changed (e.g., faded) significantly making the report outdated by the time the base station has a chance to apply it. Thus, closed-loop precoding is more suitable for low mobility scenarios where the channel variations are slow. An exception to this is if the channel exhibits long-term properties that can be exploited even though the mobility is high. Spatial correlation on the base station side is one example of such a property that is relatively stable despite high UE velocities.

In LTE, the encoded bits originating from the same block of information bits is referred to as a "codeword" (CW). A codeword is also the terminology used to describe the output from a single hybrid ARQ (HARQ) process serving a particular transport block and comprises turbo encoding, rate matching, interleaving, etc. The codeword is then modulated and distributed over the multiple transmit antennas. In multi-codeword transmission, data may be transmitted from several codewords at the same time. The first (modulated) codeword may for instance be mapped to the first two antennas, and the second codeword may be mapped to the two remaining antennas in a four transmit antenna system. But in the precoding context, the codewords are mapped to layers, and the precoder maps the layers onto the antennas.

For high rate, multi-antenna transmission, an important characteristic of the channel conditions is the channel rank (which is different from transmission rank). Roughly speaking, the channel rank can vary from one up to the minimum number of transmit and receive antennas. Taking a "4×2" system as an example, i.e., a system with four transmit antennas and two receive antennas, the maximum channel rank is two. The channel rank varies in time as fast fading alters the channel conditions. Moreover, channel rank determines how many MIMO layers/data streams, and ultimately also how many codewords, can be successfully transmitted simultaneously. Hence, if the channel rank is "one" when two codewords mapping to two separate MIMO layers are being transmitted, there is a strong likelihood that the two signals corresponding to the codewords will interfere such that both of the codewords are erroneously detected at the receiver.

In conjunction with precoding, adapting the transmission to the channel rank involves using as many data stream layers as the MIMO channels can support. In the simplest case, each MIMO layer corresponds to a particular antenna. But the number of codewords may differ from the number of data stream/layers, which is the case in LTE. The issue then arises of how to map the codewords to the data stream layers. Assuming four transmit antennas as an example, the maximum number of codewords is two while up to four layers can be transmitted.

A fixed rank dependent codeword-to-layer mapping with precoding for this non-limiting example is shown in FIG. 4. Codewords may be provided from an error correction encoder such as a turbocoder. For channel rank 1, corresponding to one layer or one data stream represented as a codeword (CW 1), the precoder 40 maps the single codeword CW 1 to the four transmit antennas. For channel rank 2, corresponding to two layers or two data streams represented as two codewords (CW 1 and CW 2), the precoder maps the two codewords to the four transmit antennas. For channel rank 3, there are two codewords (CW 1 and CW 2), and the second codeword CW 2 is split via a serial-to-parallel converter (SIP) 42 into two data streams/layers. So the precoder 40 maps the three data streams/layers generated from the two codewords to the four transmit antennas. The second codeword need not be the same length as the first codeword and may for example be twice as long as CW 1. For channel rank 4, there are two codewords (CW 1 and CW 2), and both are split via a corresponding serial to parallel converter (S/P) 42 into two data streams/layers. So the precoder 40 maps the four data streams/layers generated from the two codewords to the four transmit antennas.

Since closed-loop precoding often is not suitable for high mobility scenarios where the channel lacks significant long-term properties and is rapidly changing, an alternative is to select a transmission scheme that is independent of the channel realizations. Such channel independent transmission is also known as open-loop transmission and is more suitable for higher mobility situations. An example open-loop transmission scheme for two transmit antennas is an Alamouti code, which has a counterpart in the frequency domain called a space frequency block coding (SFBC). SFBC takes two symbols $s_k$ and $s_{k+1}$ at a time as input and distributes these symbols over frequency and space as described by the codeword matrix:

$$\begin{bmatrix} s_k & s_{k+1} \\ s_{k+1}^c & -s_k^c \end{bmatrix} \quad (2)$$

where the rows correspond to the different antenna ports, the columns correspond to the subcarrier dimension, and $(\ )^c$ denotes complex conjugate. Typically two consecutive subcarriers are chosen and, without loss of generality, this will be assumed below. So two potentially complex-valued symbols are transmitted using two subcarriers/REs. The symbol rate per RE is thus 1 corresponding to a transmission rank of one and hence suitable for rank one type channels. The above code belongs to the class of orthogonal space-time block codes (OSTBC). The time dimension can be interchanged with another dimension, for example frequency, as is often the case in OFDM. Nevertheless, such codes are referred to here as OSTBC even though they may use a dimension other than time. OSTBC codes exist for more than two transmit antennas as well, but they are typically limited in symbol rate targeting symbol rates (per RE) of one. For 4 transmit antennas, LTE has adopted a combination of SFBC and antenna switching, corresponding to a block code with the following codeword matrix:

$$\begin{bmatrix} s_k & s_{k+1} & 0 & 0 \\ 0 & 0 & s_{k+2} & s_{k+3} \\ s_{k+1}^c & -s_k^c & 0 & 0 \\ 0 & 0 & s_{k+3}^c & -s_{k+2}^c \end{bmatrix} \quad (3)$$

Even though the above code is not an OSTBC code in a strict sense, this code has a symbol rate of one and is thus suitable for rank one type channels.

Open-loop precoding using a higher transmission rank than one is also possible. But because there is no accurate information about the channel, the precoder cannot be matched to the channel. Hence, it would be beneficial to try and achieve precoding diversity to ensure generally acceptable precoder performance over a wide range of different channel conditions.

Another way to introduce open-loop precoding transmission is to reuse the purely spatial precoding structure, where a precoder multiplies a single symbol vector, which is equivalent to each symbol being multiplied by the corresponding column vector in the precoder matrix. In order to achieve precoding diversity, it is important to avoid using only a single precoder since such a transmission only suits a limited set of channel realizations. Accordingly, a single codeword can be transmitted in such a way so that multiple precoders are used, where the precoders are varied in some deterministic manner known to both the transmitter and the receiver. For example, the precoder may be fixed for one or several subcarriers and then changed for a next subcarrier(s). This distributes the energy spatially in a more isotropic manner, (i.e., more towards an even energy distribution in all directions), which provides diversity thereby reducing the tendency to bias the performance for a particular set of channel realizations. Preferably, there should be a substantial precoding variation over the smallest allocation unit, e.g., a resource block (RB), because a codeword may potentially only span a small set of REs.

This can be accomplished using "precoder cycling," as illustrated in FIG. 2, where the precoder varies from one consecutive set of subcarriers to the next. The precoders that are cycled through are predetermined or configured by the transmitter. For UEs that also have an implementation of a closed-loop precoder scheme, it is advantageous to reuse the precoders in the closed-loop precoder codebook in the open-loop scheme because then significant parts of the UE implementation can be reused for the open-loop precoding scheme.

One problem with open loop, configurable precoder cycling is that the receiver does not know and cannot accurately predict the interference it needs to reject at a particular instant. As the number of cycling precoders increases in an open loop system, it becomes increasingly difficult for the receiver to know or predict which one of the precoders is currently being used in the interfering transmissions. As a result, the receiver is uncertain of the interference changes over a radio block, and thus, does not satisfactorily suppress that interference. Another problem relates to undesirable complexity in the receiver (e.g., a UE). Using many different precoders in the precoder-cycling has the disadvantage of a high implementation complexity (and thus increased power consumption) at both the transmitter and receiver because the precoder operation and receive filtering operation must be implemented and matched to each used precoder. Also, having a configurable number of precoder matrices to cycle over means that the transmitter and receiver must be implemented to cope with the most computationally demanding scenario.

SUMMARY

Data is transmitted over a plurality of multiple input multiple output (MIMO) channels. Plural bit streams are modulated into multiple data symbol vectors. Each vector has a transmission rank with one vector for each MIMO channel. Transmission rank is the number of elements in a data symbol vector corresponding to the number of data streams being transmitted in parallel over each MIMO channel. The multiple data symbol vectors are precoded into multiple precoded symbol vectors using one of a plurality of precoder cycling sets, one set for each transmission rank, including multiple different precoders. The precoders in each precoder cycling set are substantially separated with respect to a plurality of distance measures. The precoding includes precoding each data symbol vector of a transmission rank with a precoder belonging to the precoder cycling set of that transmission rank. The precoded symbol vectors are then transmitted over the plurality of MIMO channels. In one non-limiting example embodiment, the MIMO channels correspond to sub-carriers obtained using orthogonal frequency division multiplexing (OFDM) as employed in LTE and other wireless communications systems.

A source codebook is provided with multiple codebook indices, each codebook index being associated with one precoder for each transmission rank. The transmitter stores a cycling codebook corresponding to a subset of the codebook indices in the source codebook such that a precoder cycling set of a transmission rank is the set of precoders with the corresponding transmission rank that are associated with the codebook indices in the cycling codebook. The precoders associated with the same codebook index may share one or more of the same columns.

In one non-limiting example embodiment, a number of transmission ranks is four. The four precoders associated with a codebook index have the property that a first precoder for a first transmission rank is included as a column in a second precoder for a second transmission rank, the columns of the first and second precoders are included as columns in a third precoder for a third transmission rank, and the columns of the first, second, and third precoders are included as columns in a fourth precoder for a fourth transmission rank for each set of precoders associated to an index in the codebook.

One or more different types of distance measures define one or more distances between precoders of the same transmission rank. Example multiple distance measures include chordal distance, projection two-norm distance, and Fubini-Study distance. The cycling codebook has the property that there exists no alternative cycling codebook whose associated precoder cycling sets, one set for each transmission rank, have better precoder distance properties than the precoder cycling sets associated with the cycling codebook for all transmission ranks. Preferably, the cycling codebook's associated precoder cycling sets have strictly better distance properties for each transmission rank than the precoder cycling sets associated with any other cycling codebook.

In one non-limiting example, the source codebook is a codebook specified by the LTE standard defined for transmission on four antenna ports, and the precoder cycling codebook selected is a set of four codebook indices given by four indices in the codebook. All the precoders in the precoder cycling codebook are real valued and antipodal. Each precoder in the precoder cycling codebook is a column-subset of a unitarily transformed block-diagonal matrix, where a column subset of a matrix A is a matrix for which each column is also a column in A. The highest transmission rank equals 4 and a (scaled) unitary transformation matrix is given by $$\begin{bmatrix} 1 & 0 & 1 & 0 \\ 0 & 1 & 0 & 1 \\ 1 & 0 & -1 & 0 \\ 0 & 1 & 0 & -1 \end{bmatrix},$$

or a row and column permutation thereof and is applied by multiplying from the left each precoder matrix in the precoder cycling set [or codebook?] with the conjugate transpose of the transformation matrix.

The data that is transmitted as described above may be received by a receiver configured based on the precoder cycling done in the transmitter. Multiple receive symbol vectors are received, one for each MIMO channel. The plurality of transmitted bit streams are then detected from the received symbol vectors. For example, each received symbol vector may be filtered with a filter which is computed based on the corresponding precoder that was used for precoding the data transmitted over the corresponding MIMO channel. The filtered received symbol vectors are then decoded into the plurality of transmitted bit streams.

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), programmable logic arrays, and/or using one or more digital signal processors (DSPs).

It will be apparent to one skilled in the art that other embodiments may be practiced apart from the specific details disclosed below. The technology is described in the context of an LTE system in order to provide an example and non-limiting context for explanation. But this technology may be used in any modern cellular communications system and is not limited to LTE or WiMAX.

Figure 5:
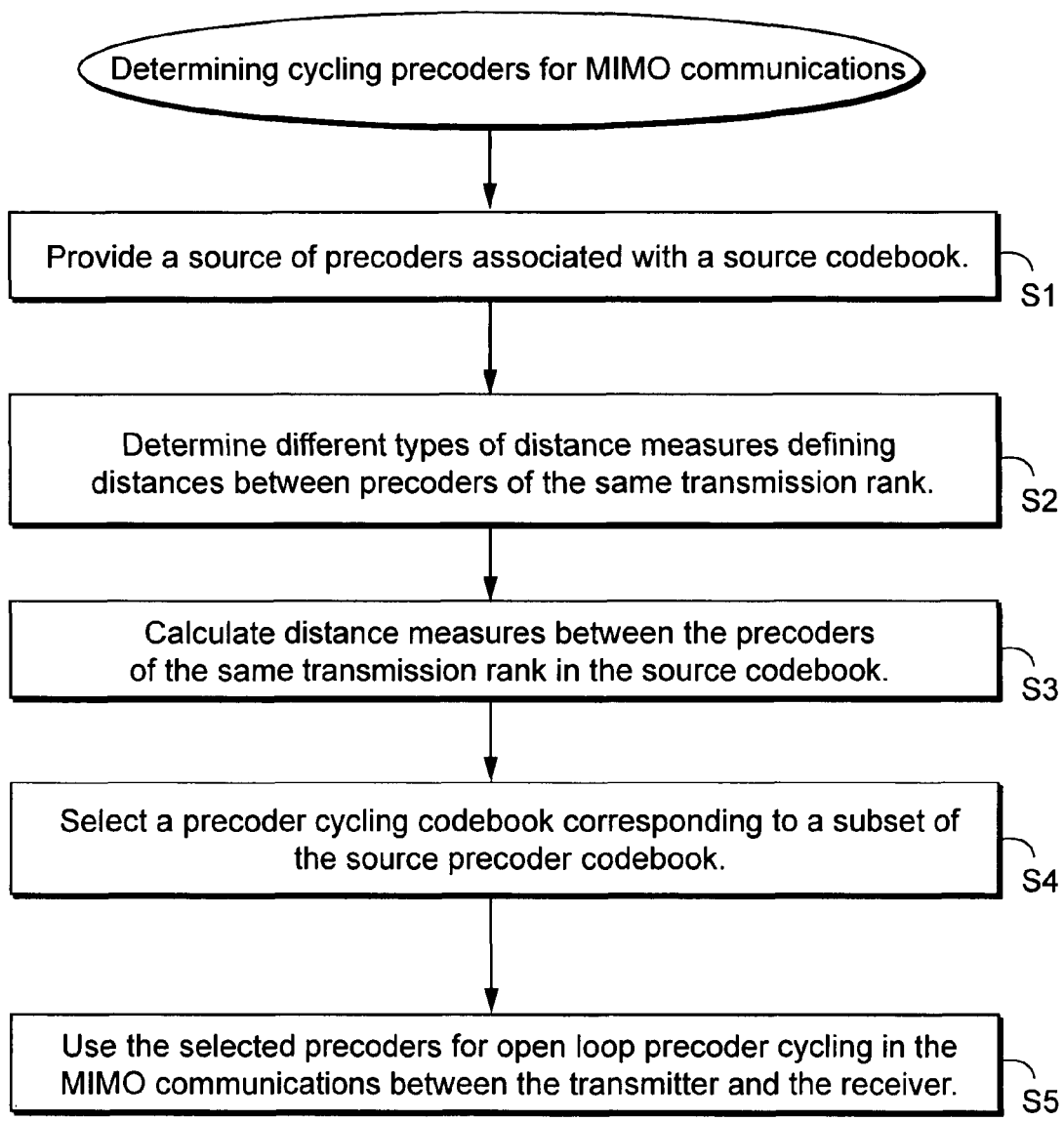
FIG. 5 is flow chart diagram illustrating non-limiting, example procedures for determining an optimal group of cycling precoders for MIMO communications.

Initially, an optimal set of cycling precoders (referred to as a precoder cycling set) may be determined for use in MIMO communications that have one or more desired distance properties. FIG. 5 is a flow chart diagram illustrating non-limiting, example procedures for determining a group of such cycling precoders for MIMO communications. A source of precoders associated with a codebook is provided (step S1). There are different sources and codebooks that may be used. One non-limiting example is described below. The precoder codebook is organized using codebook indices; each integer index value being associated with a set of precoders, one precoder for each transmission rank As defined above, transmission rank corresponds to a number of MIMO data streams to be transmitted in parallel using multiple antennas. Thus, a codebook index together with a transmission rank, uniquely identifies a precoder matrix.

One or more different types of distance measures defining one or more distances between precoders of the same transmission rank are identified (step S2). One or more distance properties between the precoders of the same transmission rank in the source codebook are then calculated using the distance measure(s) (step S3). A precoder cycling codebook, corresponding to a subset of the source precoder codebook, is then selected (step S4). The precoder cycling set, of a transmission rank, is the set of precoders in the selected precoder cycling codebook with the corresponding transmission rank. The precoders associated with the same codebook index may share one or more of the same columns. The cycling codebook has the property that there exists no alternative cycling codebook, also corresponding to a subset of the source precoder codebook, whose associated precoder cycling sets, one set for each transmission rank, has better precoder distance properties than the precoder cycling sets associated with the cycling codebook for all transmission ranks. Preferably, the cycling codebook's associated precoder cycling sets have strictly better distance properties for each transmission rank than the precoder cycling sets associated with any other cycling codebook, also corresponding to a subset of the source precoder codebook. The selected precoders are then used for open loop precoder cycling in the MIMO communications between the transmitter and the receiver (step S5).

The assumption in the non-limiting example is that the transmission rank can be 1, 2, 3, and 4; thus, each codebook index is associated with four precoders, one for each transmission rank. Preferably, the precoders associated with a codebook index, having a different transmission rank, share one or more of the same columns. In that case, a first precoder for a first transmission rank is included in a second precoder for a second transmission rank, the first and second precoders are included in a third precoder for a third transmission rank, and the first, second, and third precoders are included in a fourth precoder for a fourth transmission rank for each set of precoders associated with a codebook index.

In the non-limiting LTE example, the codebook is a closed loop precoding codebook specified by the LTE standard defined for transmission on four antenna ports in accordance with the following table where a quantity $W_n^{\{s\}}$ denotes a precoder matrix defined by columns given by the set $\{s\}$ from the expression $W_n = I - 2u_n u_n^H / u_n^H u_n$ where I is a 4×4 identity matrix and vector $u_n$ is defined for each of the codebook indices below:

As indicated, Table 1 is taken from a closed loop precoding codebook proposed for use in LTE so that implementation modules from the closed-loop mode can be reused also in the precoder cycling implementation. Each transmission rank corresponds to a column in Table 1. For example, transmission rank 1 includes precoders $W_0^{\{1\}}$-$W_{15}^{\{1\}}$. A precoder cycling set of a transmission rank is thus a subset of the precoders in the corresponding transmission rank column. Each row of the codebook in Table 1 corresponds to a codebook index. For example, index 12 includes the following precoders $W_{12}^{\{1\}}, W_{12}^{\{12\}}/\sqrt{2}, W_{12}^{\{123\}}/\sqrt{3},$ and $W_{12}^{\{1234\}}/2$, which are of different transmission rank. As can be seen from this example, all the precoders associated with the same codebook index 12 share precoder matrix $W_{12}^{\{1\}}$. The transmission rank 4 precoder for index 12 shares the precoders matrices for the three other precoders $W_{12}^{\{1\}}$, $W_{12}^{\{12\}}/\sqrt{2}$, $W_{12}^{\{123\}}/\sqrt{3}$.

The inventors, using a variety of distance measures, determined an optimal cycling codebook corresponding to a subset of the source codebook in Table 1 which includes the sets of four precoders defined by codebook indices 12, 13, 14, and 15 in Table 1. The precoder cycling sets, one for each transmission rank, thus contain four precoders each. The number of four cycling precoders was selected because it is the minimum number of precoders, of transmission rank one, required to excite all four dimensions of the four transmit antennas in this non-limiting example. It is advantageous to cycle precoders that span the space of the channel matrix well. Because a single codeword is transmitted using four different precoders corresponding to the transmission rank for the MIMO communication, precoding diversity is lower when the different precoding matrices are similar or closer in distance. On the other hand, the precoding diversity is higher if the four precoders are substantially different or further apart distancewise. Ideally, though not necessarily, the four precoders in the same transmission rank should be maximally separated using one or more distance measures. This decreases the likelihood that all four precoders are unsuitable for the channel realization and that a codeword is decoded erroneously at the receiver.

Multiple distance measures including chordal distance, projection two-norm distance, and Fubini-Study distance were used to evaluate the distance between precoders of the same transmission rank. For transmission rank r, the columns

TABLE 1

Closed loop precoding codebook

| Codebook index | $u_n$ | Transmission Rank | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ | of the precoding matrices span r-dimensional subspaces in the $N_T$-dimensional ($N_T$=4 in the codebook defined in Table 1) complex vector space.

The goal is to maximize the distances between all of the subspaces. The chordal distance may be defined by:

$$d_{chord}(W_i, W_j) = \frac{1}{\sqrt{2}} \|W_i W_i^* - W_j W_j^*\|_F$$

the projection two-norm distance by:

$$d_{proj}(W_i, W_j) = \frac{1}{\sqrt{2}} \|W_i W_i^* - W_j W_j^*\|_2$$

and the Fubini-Study distance:

$$d_{FS}(W_i, W_j) = \arccos|\det(W_i^* W_j)|.$$

For each candidate precoder cycling codebook of precoders associated with four codebook indices, there are four associated precoding cycling sets, one for each transmission rank; each of these precoder cycling sets contains four precoder matrices (one for each codebook index) of the corresponding transmission rank, (i.e., a precoder cycling set is a four element subset of a column in Table 1). For a precoder cycling set of four precoders, there are six mutual distances. Let $\{d_1, \ldots, d_6\}$ denote the ordered set of distances, i.e., $d_1 \leq \ldots \leq d_6$. For the ith candidate precoder cycling codebook (assuming that all possible sets of four indices have been ordered), let $w_i^r = [d_1 \ldots d_6]^T$ denote the vector of distances for the precoder cycling set of transmission rank r. Let the vector relation $w_i^r \preceq w_j^r$ denote $w_i^r(k) \leq w_j^r(k) \forall k$, i.e., each element in $w_j^r$ is greater than or equal to the corresponding element in $w_i^r$. The precoder cycling set of transmission rank r that is associated with a precoder cycling codebook j has better or equal distance properties than the precoder cycling set, of the same transmission rank r, that is associated with another candidate cycling codebook i, if $w_i^r \preceq w_j^r$.

From the 16 rows in Table 1 corresponding to codebook indices (rows) 0-15, there are 1820 ways to make groups of four. Based on the three distance measures and the $\preceq$-relation, an optimal subset of rows (i.e., an optimal precoder cycling codebook) includes rows 12, 13, 14 and 15 in this non-limiting example. It can be shown that this precoder cycling codebook is the only one that satisfies:

$$w_i^r \preceq w_1^r \; 1 \leq r \leq 4, \; 2 \leq i \leq 1820$$

for all three distance measures defined above, where this optimal precoder cycling codebook corresponds to the first candidate precoder cycling codebook (i.e., i=1). This means that all other candidate precoder cycling codebooks (of codebook indices) have strictly worse distance properties than the optimal cycling codebook for at least one transmission rank and one distance measure. Thus, the optimal precoder cycling codebook may be determined using intra-precoder cycling subset distance. The distance between precoding matrices is a measure on how well the matrices span the space of the MIMO channel, which also indicates how spatially isotropic the transmitted power is distributed.

The use of precoders from codebook indices 12, 13, 14 and 15 from Table 1 for precoder cycling has several other attractive aspects. One is that the elements of the precoder cycling matrices are real and antipodal so that all elements in the precoder matrix have equal magnitude but possibly a different sign. Such real and antipodal structure is particularly suitable for hardware (and software) implementations because the matrix-vector multiplication of the precoder, W, and the symbol vector, s, can be implemented without multiplications (apart from a power scaling of the precoded symbols, x) using only additions and subtractions. Additions and subtractions are much less computationally intensive than multiplications. The optimal precoder cycling subset is also particularly suitable for a cross-polarized setup where two transmit antennas have one polarization direction and two other transmit antennas have the orthogonal polarization. For example, consider the case with the antennas having +−45 degree polarizations at the transmitter. To visualize the structure of the optimal precoder cycling subset in this polarization scenario, the structure can be rotated (pre-multiplied) with the unitary transformation corresponding to:

$$U = \begin{bmatrix} 1 & 0 & 1 & 0 \\ 0 & 1 & 0 & 1 \\ 1 & 0 & -1 & 0 \\ 0 & 1 & 0 & -1 \end{bmatrix}$$

More specifically, without loss of generality, it may be assumed that the precoders within the precoding cycling set are all multiplied from the left with U*, i.e., the conjugate transpose of U. The resulting rotated precoders from optimal subset corresponding to codebook indices 12, 13, 14 and 15 are, in corresponding order, as follows:

$$\tilde{W}_{12} = \begin{bmatrix} 1 & 0 & 1 & 0 \\ 0 & 1 & 0 & 1 \\ 0 & 1 & 0 & -1 \\ 1 & 0 & -1 & 0 \end{bmatrix}, \tilde{W}_{13} = \begin{bmatrix} 0 & 1 & 0 & 1 \\ 1 & 0 & 1 & 0 \\ 1 & 0 & -1 & 0 \\ 0 & 1 & 0 & -1 \end{bmatrix},$$

$$\tilde{W}_{14} = \begin{bmatrix} 1 & 0 & 1 & 0 \\ 0 & 1 & 0 & 1 \\ 0 & -1 & 0 & 1 \\ -1 & 0 & 1 & 0 \end{bmatrix}, \tilde{W}_{15} = \begin{bmatrix} 0 & -1 & 0 & -1 \\ -1 & 0 & -1 & 0 \\ 1 & 0 & -1 & 0 \\ 0 & 1 & 0 & -1 \end{bmatrix}$$

where it is seen that after applying appropriate row and column permutations, (e.g., swap column 2 and 3 and thereafter swap row 2 and 4), a block-diagonal structure is obtained as follows:

$$\tilde{\tilde{W}}_{12} = \begin{bmatrix} 1 & 1 & 0 & 0 \\ 1 & -1 & 0 & 0 \\ 0 & 0 & 1 & -1 \\ 0 & 0 & 1 & 1 \end{bmatrix}, \tilde{\tilde{W}}_{13} = \begin{bmatrix} 0 & 0 & 1 & 1 \\ 0 & 0 & 1 & -1 \\ 1 & -1 & 0 & 0 \\ 1 & 1 & 0 & 0 \end{bmatrix},$$

$$\tilde{\tilde{W}}_{14} = \begin{bmatrix} 1 & 1 & 0 & 0 \\ -1 & 1 & 0 & 0 \\ 0 & 0 & -1 & 1 \\ 0 & 0 & 1 & 1 \end{bmatrix}, \tilde{\tilde{W}}_{15} = \begin{bmatrix} 0 & 0 & -1 & -1 \\ 0 & 0 & 1 & -1 \\ 1 & -1 & 0 & 0 \\ -1 & -1 & 0 & 0 \end{bmatrix}$$

with 2×2 sized blocks. Row permutations can alternatively be performed by permuting the columns of U. Note that the blocks are on one of the two diagonals. To see why such a block diagonal structure may be beneficial, consider a scenario in which the transmitter is using a cross-polarized antenna array where the two first antennas are co-polarized and the last two have a polarization direction orthogonal to the first pair. The precoders in the optimal precoding cycling set can then be written as $\{U\tilde{W}_k\}_{k=12}^{15}$ where $\{\tilde{W}_k\}_{k=12}^{15}$ performs precoding onto some virtual antennas and the virtual antennas are then transformed into the physical antenna dimension (or with LTE terminology, onto the antenna ports) by multiplying with U. These virtual antennas are also pair-wise cross-polarized and U can be interpreted as rotating the virtual polarization directions 45 degrees. Thus, the first two rows and last two rows of the $\{\tilde{W}_k\}_{k=12}^{15}$ matrices correspond to the first and second co-polarized antenna pair, respectively. Reordering the rows (as well as the columns) results in $\{\tilde{\tilde{W}}_k\}_{k=12}^{15}$, which means that the first two rows correspond to one cross-polarized virtual antenna pair and the two last rows correspond to the other cross-polarized virtual antenna pair. The block diagonal structure of the $\{\tilde{\tilde{W}}_k\}_{k=12}^{15}$ together with the orthogonal transmit weights $[1\ 1]^T$ and $[1\ -1]^T$ ensures that a layer is always transmitted on two orthogonal polarizations while making sure that if multiple layers are transmitted (transmission rank larger than 1), orthogonal weights are used. This improves diversity since orthogonal polarizations tend to fade rather independently. At the same time, the inter-layer interference is kept low because of the orthogonal 2×1 transmit weights. The block diagonal structure is further beneficial in that only two antennas are active for a certain channel use since the other two virtual antennas will then not risk canceling the signal from the two active ones. The two active virtual antennas tend to be fairly well-separated since they correspond to orthogonal polarizations, and hence, possible cancelation of signals due to transmissions from the pair of active virtual antennas is kept low. The beneficial block diagonal structure is maintained even for lower transmission ranks since they correspond to a column subset of the rank 4 precoders.

Figure 1:
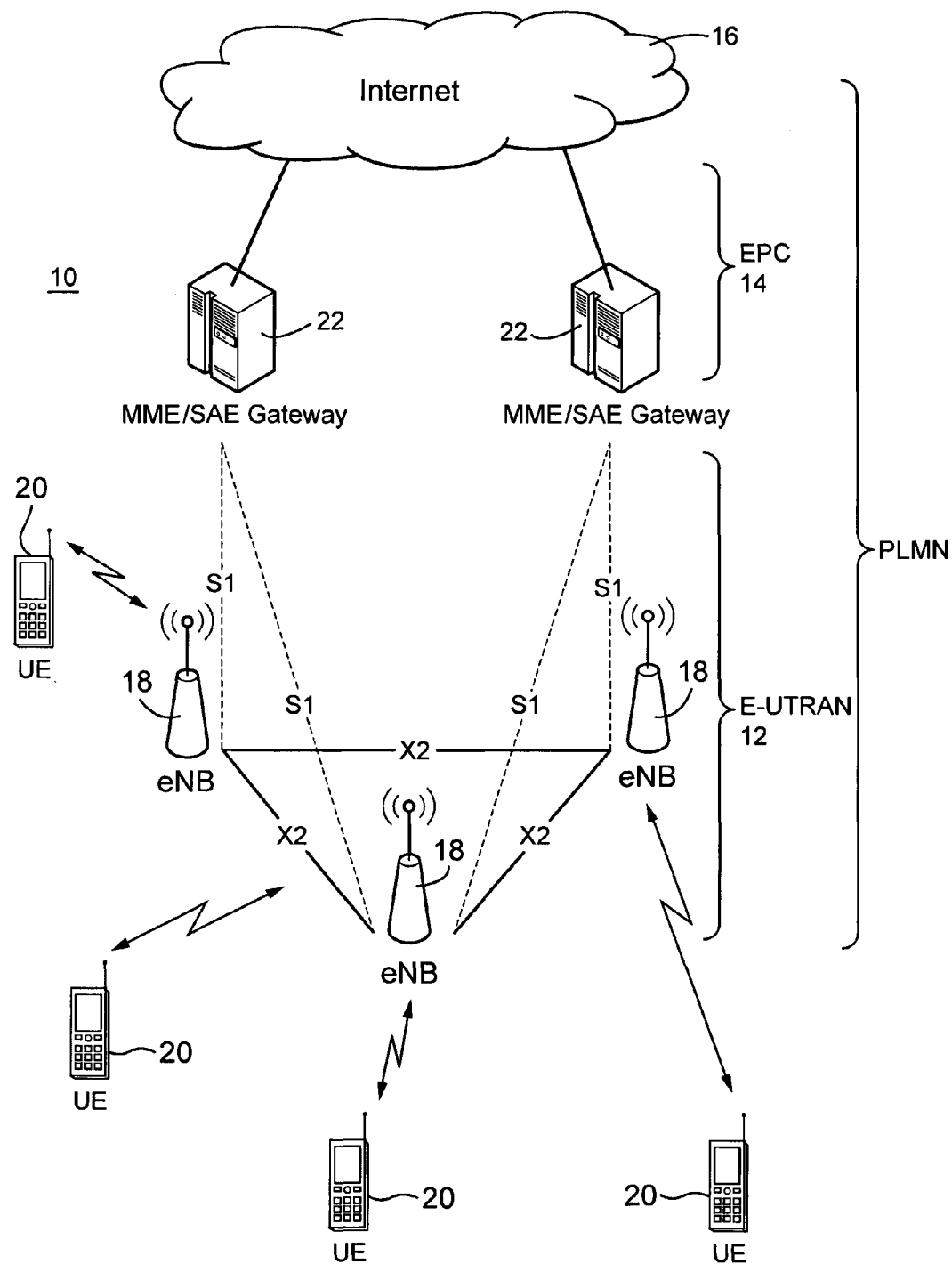
FIG. 1 is a function block diagram of an example LTE mobile radio communication system.
Figure 2:
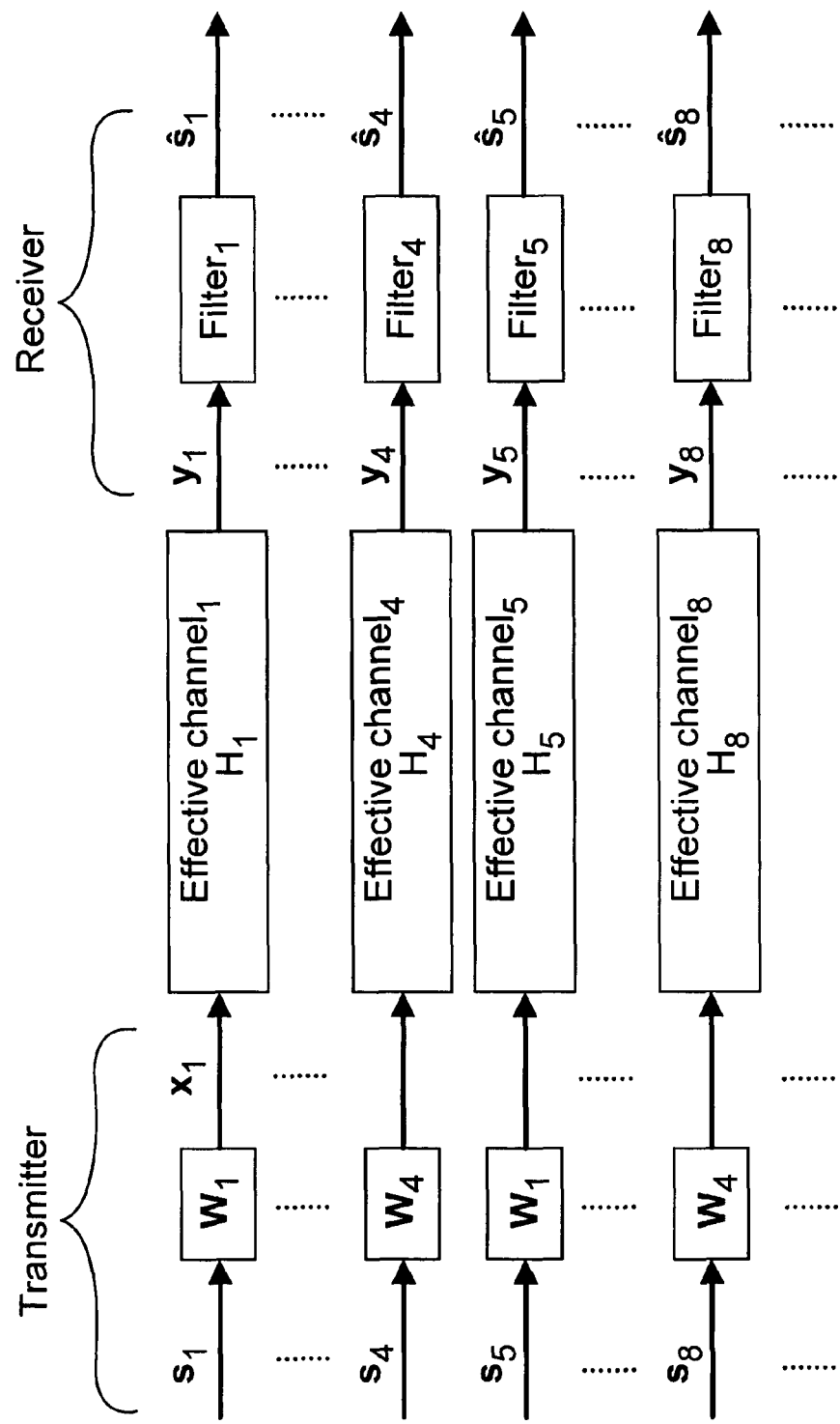
FIG. 2 illustrates a communications model using precoder cycling.
Figure 3:
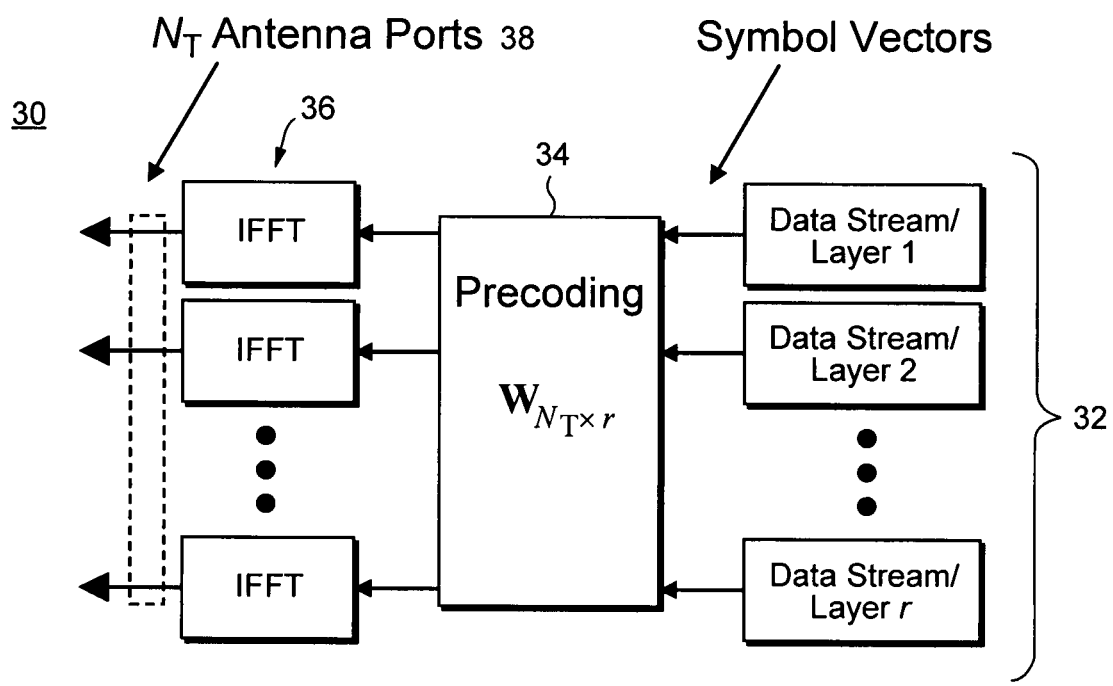
FIG. 3 illustrates a transmission structure of a precoded spatial multiplexing mode.
Figure 4:
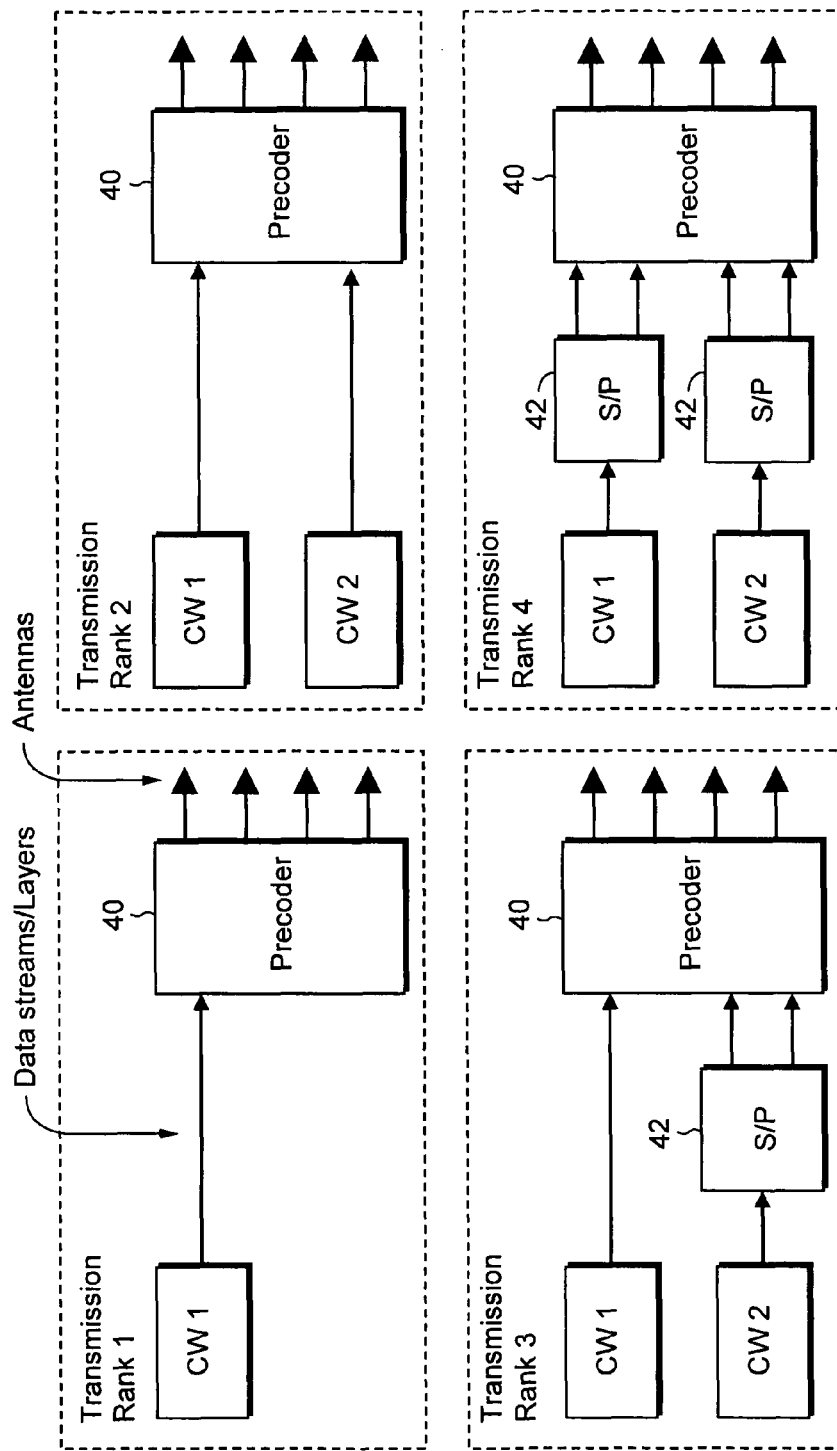
FIG. 4 is a diagram that illustrates a codeword-to-layer mapping for a four antenna transmitter.
Figure 6:
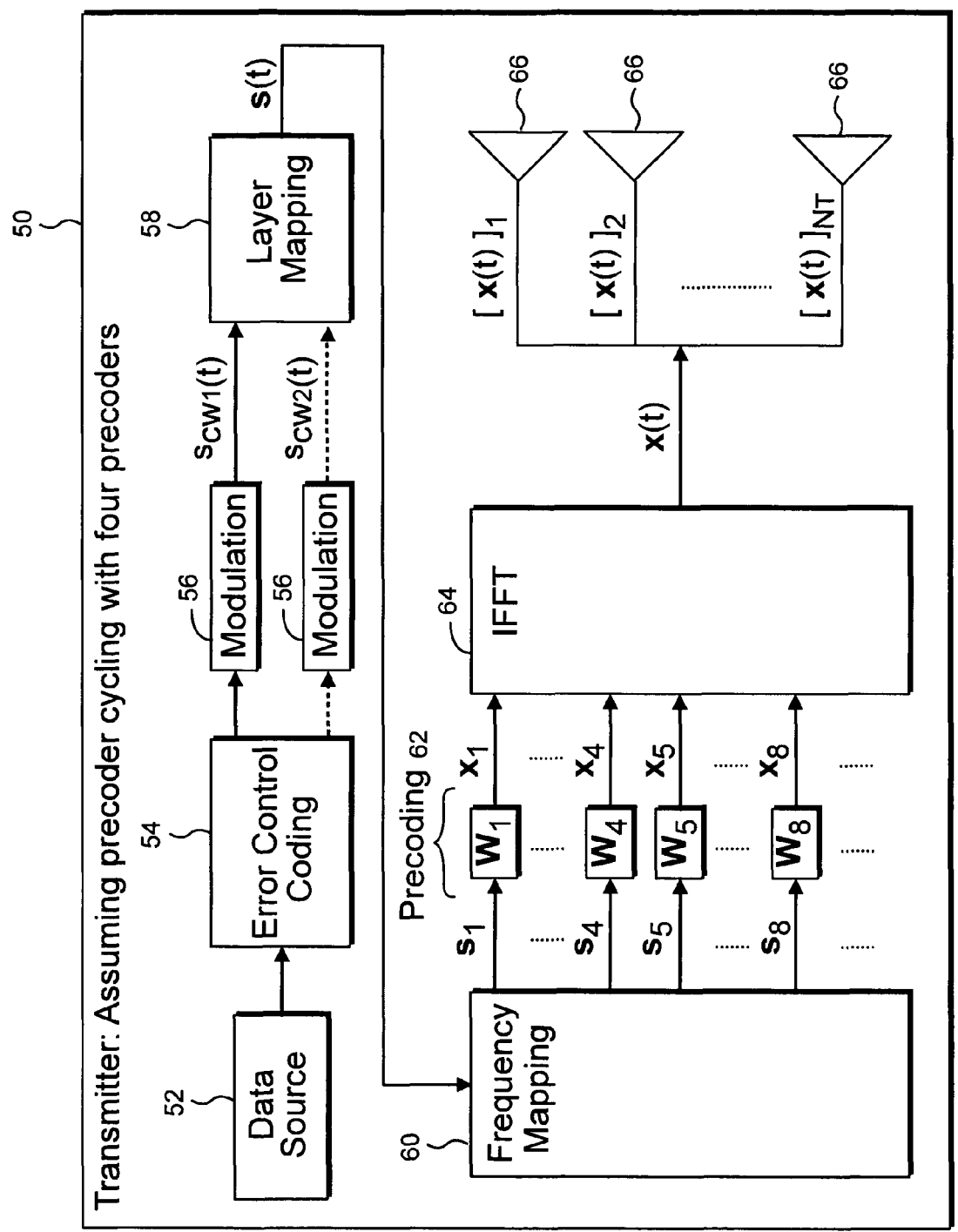
FIG. 6 is a non-limiting, example function block diagram of a transmitter that uses precoder cycling assuming four precoders.

FIG. 6 is a non-limiting example function block diagram of a transmitter that uses precoder cycling assuming four precoders such as but not limited to the four precoder cycling sets described above in conjunction with Table 1 (i.e., codebook indices 12-15). The transmitter 50 includes a data source 52 which provides data bits to an error control coding block 54, e.g., a turbocoder, which provides code words (CWs) to one or more modulation blocks 56 where the data is modulated onto symbols represented by $S_{CW_1}(T)$. If two code words are used, such as for transmission ranks 2, 3 or 4 as shown in FIG. 4, then a second modulation block 56 and a second code word symbol are generated and input to a layer mapping block 58. The data streams/MIMO layer mapping block 58 generates a symbol vector s(t) which is provided to a frequency mapping block 60. The frequency block 60 processes the symbol vector and generates parallel symbol outputs. The selected four precoders $W_1$-$W_4$ for the transmission rank of the MIMO transmitter are used in the precoding stage 62 to precode the symbol elements generated by the frequency mapper 60. For example, symbol vectors $s_1$-$s_4$ are precoded using the precoder matrices $W_1$-$W_4$ to generate precoded symbol vectors $x_1$-$x_4$. The same four precoders are then recycled to code the next four symbol vectors $s_5$-$s_8$ in the parallel output from the frequency mapper 60 to generate precoded symbol vectors $x_5$-$x_8$, and so forth. The precoded symbol outputs are provided in parallel to an inverse fast Fourier transform (IFFT) block 64 which converts the symbols from the frequency domain to the time domain to generate a single, complex, time domain signal x(t), which is mapped to the $N_T$ antennas 66, and also may insert a cyclic prefix.

Figure 7:
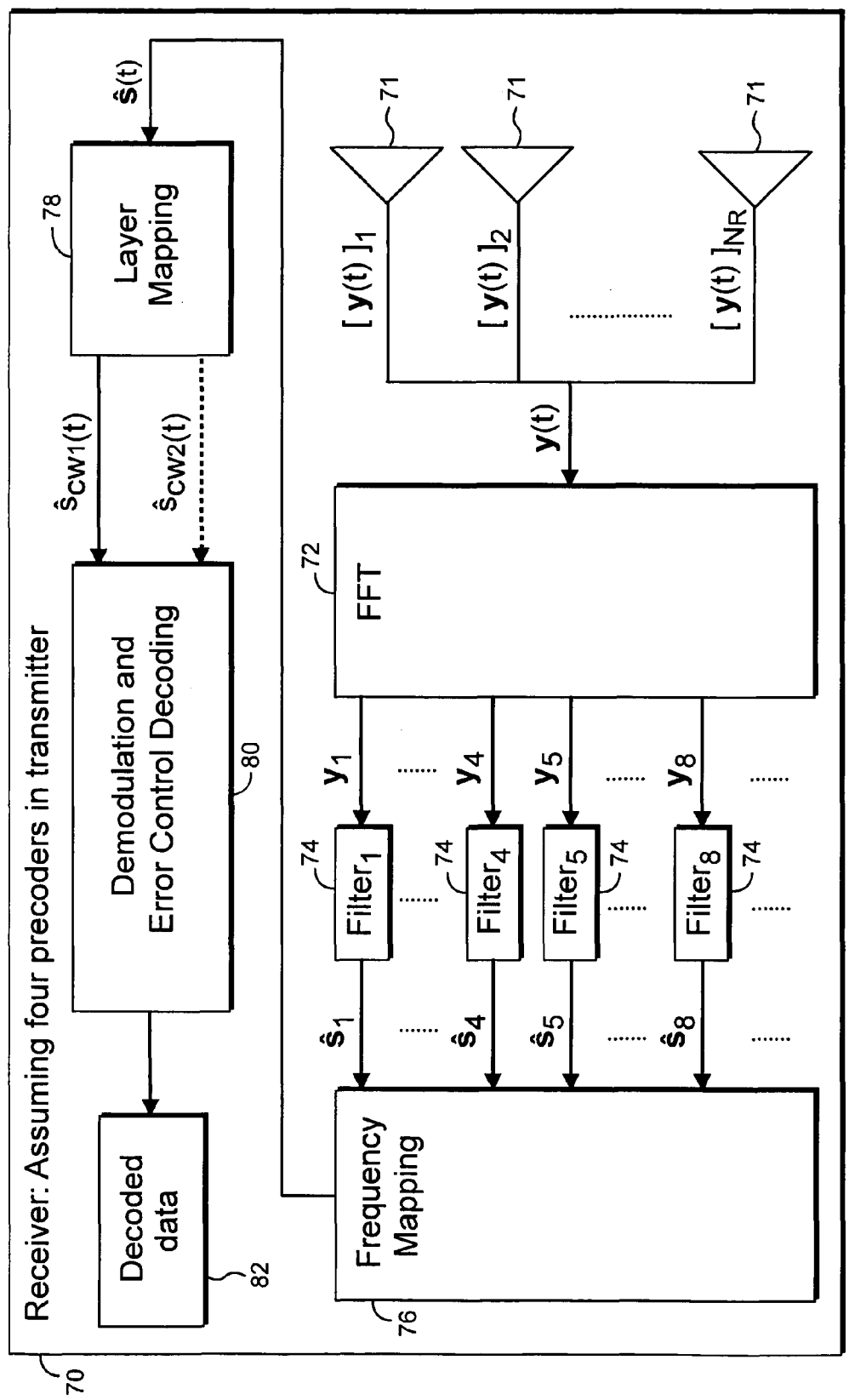
FIG. 7 is a non-limiting, example function block diagram of a receiver for receiving transmissions from the transmitter in FIG. 6.

FIG. 7 is a non-limiting, example function block diagram of a receiver 70 for receiving MIMO transmissions from the transmitter 50 in FIG. 6. $N_R$ antennas 71 receive respective received signals y(t) which are provided to a fast Fourier transform (FFT) block 72 which in turn converts the received signals from the time domain into the frequency domain and may remove a cyclic prefix if inserted at the transmitter. Each set of four parallel outputs from the FFT 72 is provided to a "bank" of four filters 74 corresponding to the four precoders used in the precoding stage 62 in FIG. 6. For example, received symbols $y_1$-$y_4$ are filtered by corresponding filters (filter$_1$-filter$_4$) to generate approximate receive signals $\hat{s}_1$-$\hat{s}_4$. If the MIMO radio channel is sufficiently static over sub-frequencies 1-8 (assuming an OFDM type system), then the filters 1-4 can be reused for filters 5-8 as shown in FIG. 7. The frequency mapping block 76 maps the approximate receive symbols to a combined approximate symbol signal in the time domain $\hat{s}(t)$. Layer mapping block 78 maps this approximate signal into one or two of proximate symbol code words. The symbol code word(s) are processed in a demodulation and error control decoding block 80 which produces a decoded data 82 hopefully corresponding to what was transmitted from the data source 52 in the transmitter.

Figure 8:
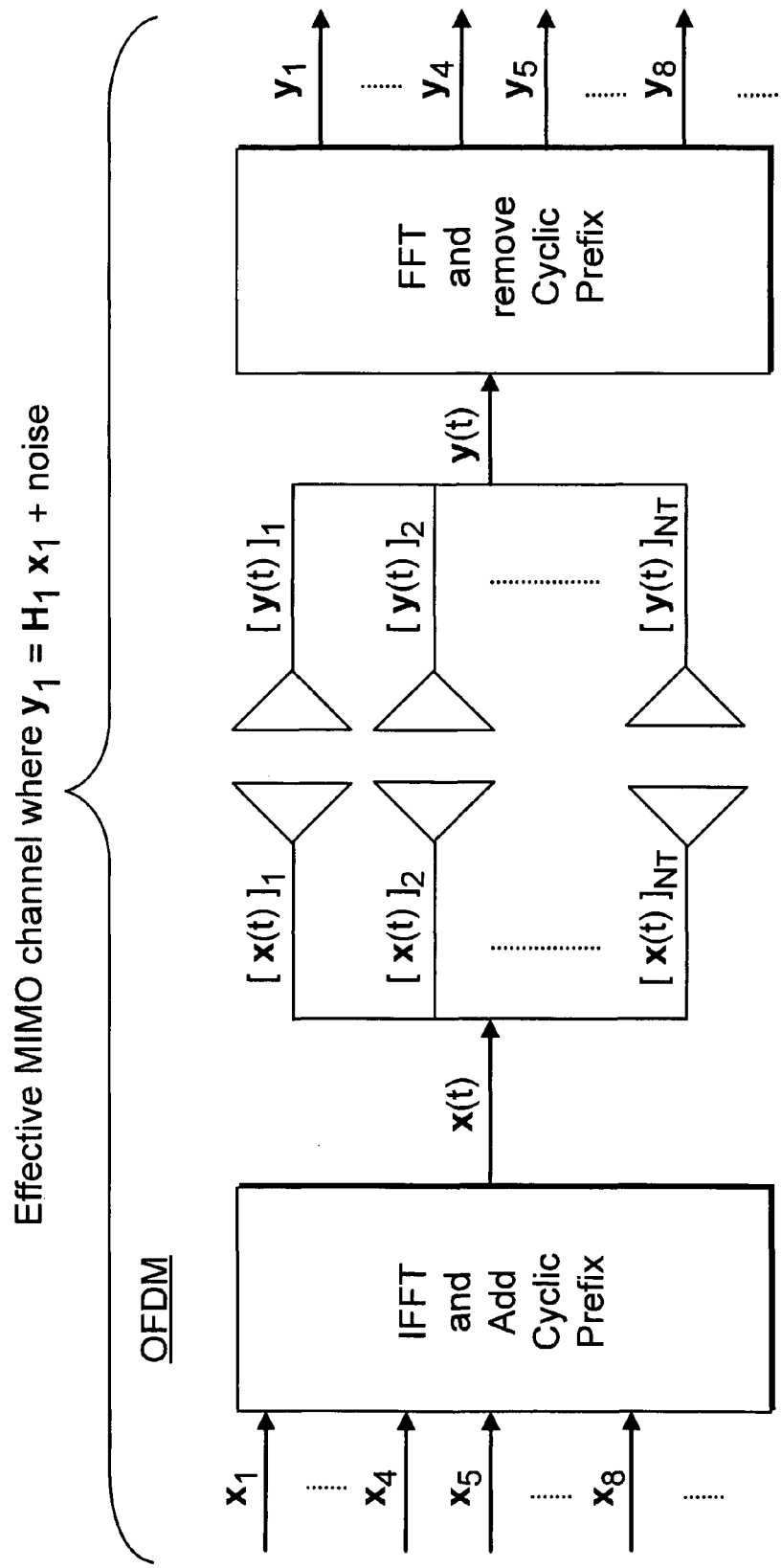
FIG. 8 illustrates an effective channel for an OFDM system.
Figure 9:
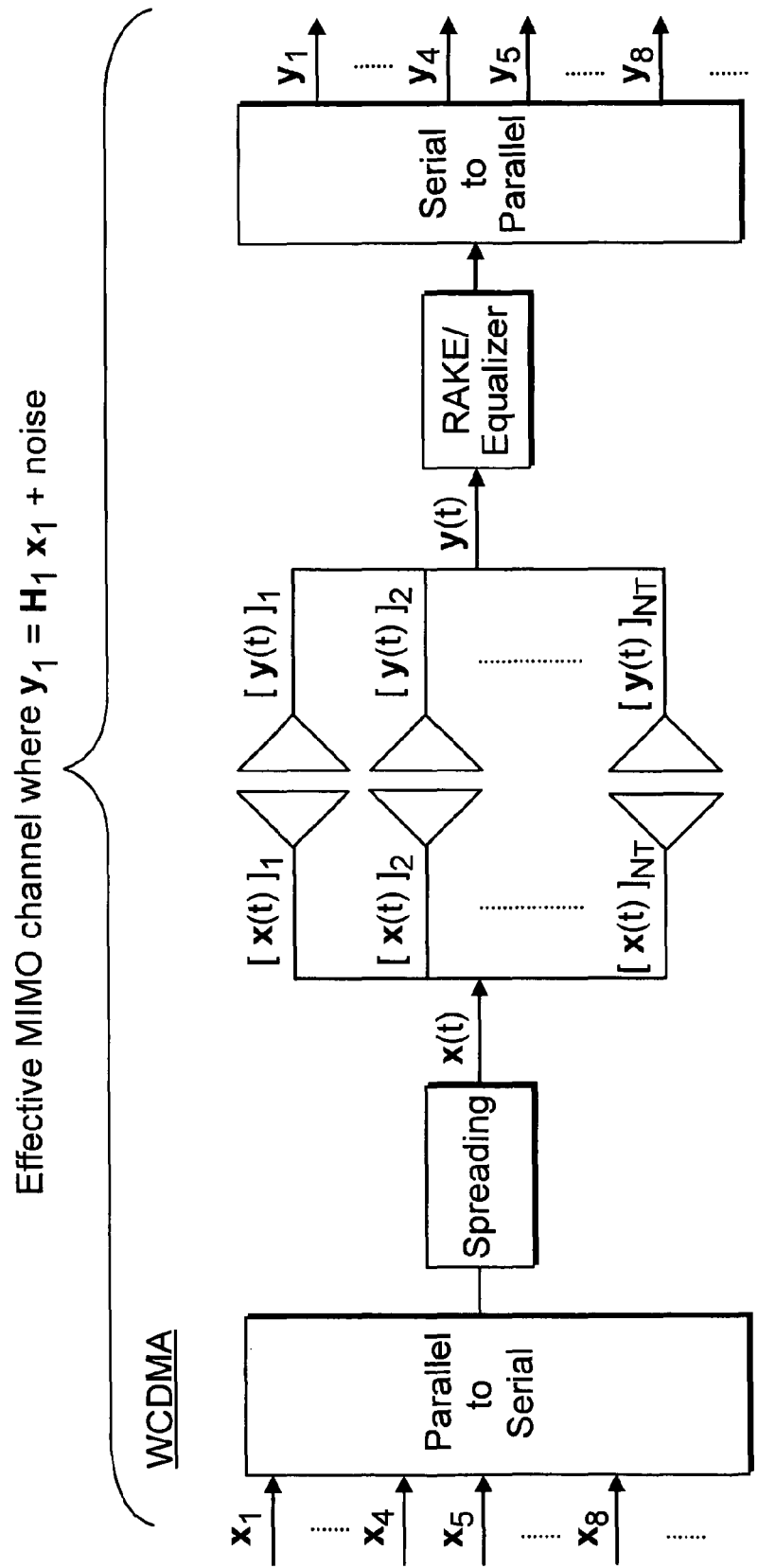
FIG. 9 illustrates an effective channel for a WCDMA system.

The technology in this application is applicable to other types of radio access techniques. FIGS. 8 and 9 are two different examples of effective channels described in the background section. In the above LTE example, the system is assumed to be an OFDM type system such as that shown in FIG. 8. FIG. 9, shows an example application to a wideband code division multiple access (WCDMA) system. Here, the precoded symbols x are converted from parallel to serial format to a precoded symbol signal x(t) for transmission over the MIMO antennas. At the receiver side, the antenna receive signals y(t) are combined into a single received signal, equalized in an equalizer, and then converted to parallel format to produce the received symbols for precoder filtering. Notably, the need to perform IFFT/FFT operations as well as to add and remove cyclic prefixes is not necessary in the WCDMA case.

Figure 10:
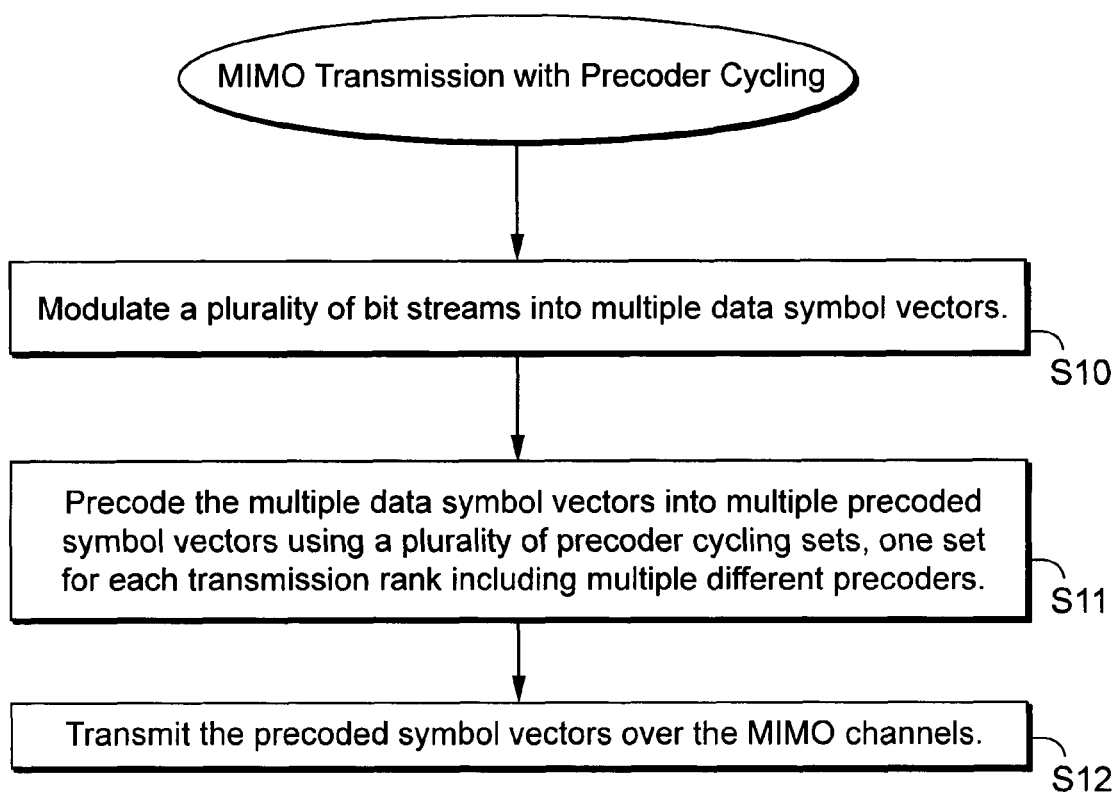
FIG. 10 is flow chart diagram illustrating non-limiting, example procedures for MIMO transmission with precoder cycling.

FIG. 10 is flow chart diagram illustrating non-limiting, example procedures for MIMO transmission with precoder cycling and is entitled "Figure MIMO Transmission with Precoder Cycling." Plural bit streams are modulated into multiple data symbol vectors (s1-s8), each vector having a transmission rank, with one vector for each MIMO channel (step S10). As explained above, the transmission rank is the number of elements in a data symbol vector corresponding to the number of data streams being transmitted in parallel over each MIMO channel. The multiple data symbol vectors are precoded into multiple precoded symbol vectors using a plurality of precoder cycling sets, one set for each transmission rank including multiple different precoders (step S11). The precoders in each precoder cycling set are substantially separated with respect to a plurality of distance measures. Each data symbol vector of a transmission rank is precoded with a precoder belonging to the precoder cycling set of that transmission rank. The precoded symbol vectors are then transmitted over the MIMO channels (step S12).

The data that is transmitted as described above may be received by a receiver configured based on the precoder cycling done in the transmitter. Multiple receive symbol vectors are received, one for each MIMO channel. The plurality of transmitted bit streams are then detected from the received symbol vectors. For example, each received symbol vector may be filtered with a filter which is determined based on the corresponding precoder used for precoding the data transmitted over the corresponding MIMO channel. The filtered received symbol vectors are then decoded into the plurality of transmitted bit streams.

In summary, specific precoding matrices are selected from a codebook and used for open loop precoder cycling. For all channel ranks, the cycle precoder matrices are preferably associated to the same set of indices in the codebook (same set of rows in a table representation). This enables efficient receiver implementation because for each transmission rank, many columns in the precoder matrices are common with the precoder matrices used for other ranks. For all channel ranks, the cycle precoder matrices are preferably maximally separated (but at least substantially) using one or more distance measures to isotropically spread the transmitted energy. In one non-limiting example embodiment, a precoder cycling period of four is assumed, i.e., four different precoding matrices are used on different sub-carriers, but other cycling periods may be used. It is preferable but not necessary to use the predetermined different precoding matrices equally many times during one codeword. A cycling group of some number other than four precoders may be used. For the example case presented above, one optimal group was found using a set of specific example distance measures. But in other cases, several groups may be equivalently or nearly as good. Other additional aspects may be used to choose a group, for instance a group with only real-valued precoding matrices. Other distance measures may be used as well.

The performance and complexity of precoder cycling benefits with precoder cycling sets that are designed to meet one, some, or preferably, all of the following four criteria: the precoder cycling set has optimized distance properties with respect to a plurality of distance metrics so as to achieve maximum spatial diversity; precoders of different transmission rank share columns in order to simplify the implementation of transmission rank adaptation; the elements of the precoder matrices are real valued and antipodal which simplifies the hardware implementation of the precoding operation; and the precoder matrices have a block diagonal structure so as to maximally utilize the properties of cross-polarized antenna setups. For a LTE precoder codebook for four transmit antennas, the inventors propose precoder cycling with the precoders represented by the codebook indices 12, 13, 14, and 15 in Table 1. This precoder cycling codebook satisfies all four of these desirable properties, and the associated precoder cycling sets are distance optimal with respect to all of the considered distance measures for all transmission ranks. Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for transmitting data over a plurality of multiple input multiple output (MIMO) channels comprising:

modulating a plurality of bit streams into multiple data symbol vectors, each vector having a transmission rank with one vector for each MIMO channel, wherein transmission rank is the number of elements in a data symbol vector corresponding to the number of data streams being transmitted in parallel over each MIMO channel;

precoding the multiple data symbol vectors into multiple precoded symbol vectors using multiple precoders, wherein a precoder is a matrix having plural columns, belonging to a first open-loop precoder cycling codebook of precoders that are grouped into precoder cycling sets, one set for each transmission rank including multiple different precoders, wherein the precoders within each precoder cycling set are substantially separated with respect to a plurality of distance measures, wherein the precoding includes precoding each data symbol vector of a transmission rank with a precoder belonging to the precoder cycling set of that transmission rank;

wherein the first precoder cycling codebook comprises the precoders associated with the codebook indices 12, 13, 14, and 15 in the following table where a quantity $W_n^{\{s\}}$ denotes a precoder matrix defined by columns given by the set $\{s\}$ from the expression $W_n = I - 2u_n u_n^H / u_n^H u_n$ where I is a 4×4 identity matrix and vector $u_n$:

| Codebook index | $u_n$ | Transmission Rank | | | |
|---|---|---|---|---|---|
| | | 1 | 2 | 3 | 4 |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ | and transmitting the precoded symbol vectors over the plurality of MIMO channels.

2. The method of claim 1, wherein the plurality of MIMO channels corresponds to sub-carriers obtained using orthogonal frequency division multiplexing (OFDM).

3. The method of claim 1, wherein a precoder, share one or more of the same columns, disregarding normalization factors, with a precoder in a precoder cycling set of a higher transmission rank.

4. The method of claim 1, wherein a number of transmission ranks is four.

5. The method of claim 4, wherein, disregarding normalization factors, each precoder belonging to a precoder cycling set of a first transmission rank, is included as a column or columns in a precoder belonging to a precoder cycling set of a second transmission rank, wherein each precoder belonging to a precoder cycling set of a first or a second transmission rank is included as columns in a precoder belonging to a precoder cycling set of a third transmission rank, and wherein each precoder belonging to precoder cycling set of a first, second, or third transmission rank is included as columns in a precoder belonging to a precoder cycling set of a fourth transmission rank.

6. The method of claim 1, wherein:

one or more different types of distance measures define one or more distances between precoders of the same transmission rank, the first precoder cycling codebook is a subset of a source precoder codebook that includes multiple precoders of a plurality of transmission ranks; and there exists no second precoder cycling codebook that satisfies the following conditions:
1) the second precoder cycling codebook is a subset of the source precoder codebook,
2) each of the precoder cycling sets, one for each transmission rank, associated with the second precoder cycling codebook, has the same number of precoders as the corresponding precoder cycling set of the first precoder cycling codebook,
3) each of the precoder cycling sets, one for each transmission rank, associated with the second precoder cycling codebook, has equal or better distance properties, with respect to the one or more distance measures, than the corresponding precoder cycling set of the first precoder cycling codebook, and
4) at least one of the precoder cycling sets associated with the second precoder cycling codebook, has better distance properties, with respect to at least one of the distance measures, than the corresponding precoder cycling set associated with the first precoder cycling codebook.

7. The method of claim 6, wherein the first precoder cycling codebook has the additional property that each of the precoder cycling sets have equal or better distance properties, with respect to the one or more distance measures, than the corresponding precoder cycling set, of any alternative third precoder cycling codebook;
given that the number of precoders in each of the precoder cycling sets of the third precoder cycling codebook is equal to the number of precoders in the corresponding precoder cycling set of the first precoder cycling codebook.

8. The method of claim 6, wherein the source codebook is a codebook specified by the LTE standard.

9. The method of claim 8, wherein the codebook is defined for transmission on four antenna ports in accordance with the following table where a quantity $W_n^{\{s\}}$ denotes a precoder matrix defined by columns given by the set $\{s\}$ from the expression $W_n = I - 2u_n u_n^H / u_n^H u_n$ where I is a 4×4 identity matrix and vector $u_n$:

11. The method of claim 1, wherein all the precoders that belong to a precoder cycling set are real-valued matrices with antipodal elements or a complex rotation of such matrices.

12. The method of claim 1, wherein one of the precoder cycling sets in the first precoder cycling codebook of precoders has a block-diagonal structure including:
a scaled unitary matrix;
a plurality of block diagonal matrices, wherein a block-diagonal matrix is a matrix that has all non-zero elements in blocks along a diagonal; and
a plurality of column subsets of a plurality of block-diagonal matrices,
wherein a column subset of a first matrix is a second matrix formed from a plurality of columns of the first matrix arbitrarily ordered, and
wherein each precoder in the one precoder cycling set is a matrix product of the scaled unitary matrix multiplied by one of the plurality of column subsets of a plurality of block-diagonal matrices.

13. The method of claim 12, wherein all of the precoding cycling sets in the first precoder cycling codebook of precoders have the block-diagonal structure, and wherein the scaled unitary matrix and the column permutation are the same for all of the precoding cycling sets in the first precoder cycling codebook of precoders.

14. The method of claim 12, wherein the precoders have four rows and the scaled unitary matrix is given by:

$$\begin{bmatrix} 1 & 0 & 1 & 0 \\ 0 & 1 & 0 & 1 \\ 1 & 0 & -1 & 0 \\ 0 & 1 & 0 & -1 \end{bmatrix},$$

or a row and/or a column permutation thereof.

15. A transmitter for transmitting data over a plurality of multiple input multiple output (MIMO) channels; the transmitter comprising:
a modulator configured to modulate a plurality of bit streams into multiple data symbol vectors, each vector having a transmission rank with one vector for each MIMO channel, wherein transmission rank is the num-

| Codebook index | $u_n$ | Transmission Rank | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ 1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$. |

10. The method of claim 6, wherein multiple distance measures are used and include chordal distance, projection two-norm distance, and Fubini-Study distance.

ber of elements in a data symbol vector corresponding to the number of data streams being transmitted in parallel over each MIMO channel;

multiple precoders configured to precode the multiple data symbol vectors into multiple precoded symbol vectors, wherein a precoder is a matrix having plural columns, belonging to a first open-loop precoder cycling codebook of precoders that are grouped into precoder cycling sets, one set for each transmission rank including multiple different precoders, wherein the precoders within each precoder cycling set are substantially separated with respect to a plurality of distance measures;

wherein the multiple precoders are configured to precode each data symbol vector of a transmission rank with a precoder belonging to the precoder cycling set of that transmission rank;

wherein the first precoder cycling codebook comprises the precoders associated with the codebook indices 12, 13, 14, and 15 in the following table where a quantity $W_n^{\{s\}}$ denotes a precoder matrix defined by columns given by the set $\{s\}$ from the expression $w_n = I - 2u_n u_n^H / u_n^H u_n$ where I is a 4×4 identity matrix and vector $u_n$:

| Codebook index | $u_n$ | Transmission Rank 1 | 2 | 3 | 4 |
|---|---|---|---|---|---|
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$; | and plural antenna configured to transmit the precoded symbol vectors over the plurality of MIMO channels.

16. A receiver for receiving data that is transmitted over a plurality of MIMO channels, the receiver comprising:

plural antenna configured to receive multiple receive symbol vectors, one for each MIMO channel, and a bank of filters configured to correspond to and be based on multiple precoders which comprise a transmitter which transmitted the data over the plurality of MIMO channels and to provide filtered received symbol vectors, the bank of filters being configured in accordance with the multiple precoders having precoded the multiple data symbol vectors into multiple precoded symbol vectors, wherein a precoder is a matrix having plural columns, belonging to a first open-loop precoder cycling codebook of precoders that are grouped into precoder cycling sets, one set for each transmission rank including multiple different precoders, wherein the precoders within each precoder cycling set are substantially separated with respect to a plurality of distance measures;

wherein the multiple precoders having been configured to precode each data symbol vector of a transmission rank with a precoder belonging to the precoder cycling set of that transmission rank;

wherein the first precoder cycling codebook comprises the precoders associated with the codebook indices 12, 13, 14, and 15 in the following table where a quantity $W_n^{\{s\}}$ denotes a precoder matrix defined by columns given by the set $\{s\}$ from the expression $w_n = I - 2u_n u_n^H / u_n^H u_n$ where I is a 4×4 identity matrix and vector $u_n$:

| Codebook index | $u_n$ | Transmission Rank 1 | 2 | 3 | 4 |
|---|---|---|---|---|---|
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2.$ |

\* \* \* \* \*

UNITED STATES PATENT AND TRADEMARK OFFICE
CERTIFICATE OF CORRECTION

PATENT NO.       : 8,537,924 B2                                Page 1 of 1
APPLICATION NO.  : 12/812159
DATED            : September 17, 2013
INVENTOR(S)      : Jongren et al.

It is certified that error appears in the above-identified patent and that said Letters Patent is hereby corrected as shown below:

In the Specification

In Column 2, Line 11, delete "MIMEs/SAE" and insert -- MMEs/SAE --, therefor.

In Column 3, Line 14, delete " $W_{N_{dt}\ T\times r}$ " and insert -- $W_{N_T\times r}$ --, therefor.

In Column 4, Line 63, delete "(SIP)" and insert -- (S/P) --, therefor.

In Column 5, Line 3, delete "(SIP)" and insert -- (S/P) --, therefor.

In Column 10, Line 11, delete "$W_{12}^{\{1234\}/2}$," and insert -- $W_{12}^{\{1234\}}/2$, --, therefor.

In the Claims

In Column 20, Line 22, in Claim 16, delete " $W_n = I - 2u_n u_n^{H/u}{}_n^H u_n$ " and insert -- $W_n = I - 2u_n u_n^H / u_n^H u_n$ --, therefor.

Signed and Sealed this
Eleventh Day of March, 2014

Michelle K. Lee
*Deputy Director of the United States Patent and Trademark Office*